(12) United States Patent
Smith

(10) Patent No.: US 8,347,543 B1
(45) Date of Patent: Jan. 8, 2013

(54) LASER SYSTEM FOR MEASURING MOTION OF A GAS AND FOR AIMING AN OBJECT

(76) Inventor: David C. Smith, Old Saybrook, CT (US)

( * ) Notice: Subject to any disclaimer, the term of this patent is extended or adjusted under 35 U.S.C. 154(b) by 95 days.

(21) Appl. No.: 12/882,028

(22) Filed: Sep. 14, 2010

(51) Int. Cl.
*F41G 1/32* (2006.01)

(52) U.S. Cl. ............. 42/114; 42/115; 89/200; 89/41.06; 356/614; 356/615; 356/622; 73/170.12

(58) Field of Classification Search .................... 42/113, 42/114, 115; 244/3.13; 89/200, 41.06, 41.17; 356/614, 615, 622; 73/170.11, 170.12, 195, 73/861, 152.29, 204.11
See application file for complete search history.

(56) References Cited

U.S. PATENT DOCUMENTS

| | | | | |
|---|---|---|---|---|
| 4,129,775 | A * | 12/1978 | O'Meara | 250/203.1 |
| 4,571,076 | A | 2/1986 | Johnson | |
| 4,787,291 | A | 11/1988 | Frohock, Jr. | |
| 5,042,922 | A * | 8/1991 | Pepper | 349/17 |
| 5,180,881 | A | 1/1993 | Wootton | |
| 5,198,607 | A * | 3/1993 | Livingston et al. | 89/1.11 |
| 5,955,724 | A | 9/1999 | Livingston | |
| 5,992,292 | A | 11/1999 | Ennenga | |
| 6,066,842 | A * | 5/2000 | Livingston | 250/203.2 |
| 6,363,648 | B1 * | 4/2002 | Kranich et al. | 42/117 |

OTHER PUBLICATIONS

Smith, David C. "High Power Laser Propagation: Thermal Blooming" (1977) Proceedings of the IEEE vol. 65, No. 12 Dec. 1977, p. 1679-1714.
"Firearms—Laser Sight" (2010) www.wikipedia.com, extract, (1) page.

* cited by examiner

*Primary Examiner* — J. Woodrow Eldred
(74) *Attorney, Agent, or Firm* — C. Nessler

(57) ABSTRACT

Measurement of the deviation of a laser beam from a straight line, where the laser beam is of a type which causes thermal blooming, is used to determine the integrated effect which wind will have on an article traveling through airspace, for example, to enable an adjustment in the aim point of the article. The invention includes correcting the aim point of a gun firing a projectile, correcting the flight path of an aircraft, and correcting the path of a watercraft. The invention includes a method and means for measuring the flow of fluid in a conduit or as a free mass, for purposes other than adjusting the path of a projectile or the like.

18 Claims, 9 Drawing Sheets

| N | P | V | | |
|---|---|---|---|---|
| 0 | 1.9 | 0 | ⊘ | (a) |
| 1.35 | 1.8 | 1 | ⌀ | (b) |
| 2.7 | 3.6 | 1 | ⊜ | (c) |
| 5.4 | 3.6 | 0.5 | ☾ | (d) |
| 10.8 | 7.2 | 0.5 | ☾ | (e) |
| 21.6 | 7.2 | 0.25 | ☾ | (f) |

LASER SYSTEM FOR MEASURING MOTION OF A GAS AND FOR AIMING AN OBJECT

TECHNICAL FIELD

The present invention relates to means and method for measuring transverse fluid velocity and for adjusting the aim points of articles traveling through windy airspace, including a bullet from a firearm, an aircraft, or a watercraft.

BACKGROUND

Cross winds affect the paths of various things moving through air. For example, they influence a bullet fired at a distant object, a boat moving across water, or an airplane approaching a landing strip. The problem with bullets is first described: When a bullet is fired from a firearm, such as a common rifle, the bullet is subjected to forces which deflect it from a desired straight line path which runs along the centerline of the barrel of the gun to the target. That straight line path is called here the Line of Sight (LOS). Influences which cause a bullet to deviate from the LOS include gravity and wind; and gun sights often have built-in means for selectively compensating for such. There are other effects on the travel path of a bullet, e.g., those induced by the spin of a bullet, which are beyond the scope of the present discussion.

Suppose a bullet is fired horizontally. Gravity causes the bullet to drop vertically below the LOS. To compensate for gravity, the exit end of the barrel of the gun is elevated from the LOS so the bullet first angles upwardly, and travels along an arc path trajectory to the target. The amount of elevation adjustment depends on the distance to the target (the "range") and the velocity of the bullet; in sum, it depends on the time of travel. Since manufactured cartridges impart consistent velocities to bullets, cartridge makers are able to provide tables showing the trajectory of bullets according to range. Thus, the effect of gravity is predictable and correctable, to the extent range is known.

A wind transverse to the LOS causes a bullet to move with the wind and the bullet impact point is laterally displaced from the aim point. To compensate for transverse wind (which as a simplification in this discussion is assumed to be blowing parallel to the earth surface), the barrel of a gun is angled from the LOS in the horizontal plane, so the bullet travels along an arc curve trajectory BP, as illustrated in FIG. 1. Angling of the barrel, by adjusting or "clicking" the gun sight, is called a windage adjustment. (In firearms parlance, windage refers both to the deflection caused by wind, and the adjustment to compensate for the deflection.) The amount of adjustment which is needed depends on (a) the velocity and direction of the wind; (b) the bullet velocity; and (c) the range. The range (c) divided by the average velocity (b) is the time of travel. Heretofore, small arms gun sights have been adjusted for windage based on the shooter's estimate of the wind velocity and the range, or based on the observed deviation of a test shot. The deviation can be significant. For example, the approximate deviation for a .30-06 caliber bullet moving in a crosswind of 5 mph (224 cm/s) is about 79 cm over a range of 1000 m.

Firing a test shot and observing the windage deflection is often not feasible. First, the point of impact of the test shot may not be observable. Second, the test shot may compromise the purpose of the shooter, such as by alerting hunting prey and causing the prey to bolt away before a second windage-corrected shot can be made.

In a present day situation, a shooter may have information about wind velocity at the shooter's location (as from a wind gage he or she holds) and the distance to the target. Skilled shooters will also observe natural signs, such as the bending of vegetation, motion of dirt or water, etc. However, there can be variation in wind velocity and direction along the path, and thus a windage adjustment based on velocity at the shooter location or a way point may be wrong. Frequently, a windage adjustment is based on judgment rather than exact measurement. Thus, there is a need for a better means of determining and correcting for the effects of wind along the flight path of a bullet. The present invention seeks to provide that.

Turning briefly to aircraft, winds obviously affect their flight paths. Pilots commonly estimate and correct for the integrated effects of wind along the path between the plane and a destination, also referred to in this application as the target point. The need for immediate information and corrective action is acute when a plane is landing. Cross winds can cause a plane to move sideways with respect to its alignment with the runway. Wind shear, or localized changes in wind direction, may have vertical and horizontal components. Flying of large airplanes and compensating for wind during landing is now sophisticated. For example, in the 1990's airborne wind shear detectors using X-band Doppler radar were commercialized. However, for smaller planes it could be useful to have an alternative tool for detecting the integrated wind effects along the flight path, from either the cockpit of the plane or from the ground.

Turning to sailboats and motor boats, they also are deflected from their intended paths by transverse winds. Expert sailors are often very skilled at "reading" the magnitude and direction of the wind. They may observe pennants, the water surface, birds, other boats, etc. Of course, when the just-traveled portion of the travel path is known, as from electromagnetic positioning systems or other navigation means, the just-past wind effect may be determined—provided it can be separated from any deflection induced by water current. Nonetheless, it would be beneficial to have an accurate measure of the integrated magnitude of wind along the intended path, to the extent present means do not provide that, or to the extent the present means are costly.

Implicit in resolving the foregoing situations is measuring the air velocity. Knowing the wind may be of interest for other reasons than guiding an article through airspace, e.g., for meteorological purposes, effect on heating and cooling of things, etc. Thus, there is general continuing need for measuring well the motion of air in the atmosphere, and a generalized and continuing need for measuring the motion of fluids transverse to an observation point, for instance, or to determine volume flow of fluids, both within and without conduits in commercial and industrial processes.

SUMMARY

An object of the invention is to provide a way for determining the needed correction in the flight path of a article which is intended to travel through airspace which has a component of motion that is transverse to the direction of intended line of sight path, i.e., where there is a wind. Further objects of the invention are to provide better means for windage adjustment for shooters of firearms, for operators of boats and for pilots of airplanes, where those things encounter air motion transverse to their paths of travel. A further object of the invention is the measure the velocity and the flow rate of a fluid, including air, within a conduit or in an unconstrained mass.

The invention makes use of a laser, called here a windage laser, which discharges a beam into fluid medium and results in thermal blooming. As a result the beam travels along a curved path and any distant impact point is displaced from the aim point. The displacement is a direct function of the distance or range, and an inverse function of the transverse velocity of the medium. A laser beam traveling through a cross wind is deflected upwind, in comparison to a bullet or other object which is deflected down-wind.

In an embodiment in accord with the invention, the travel path of an article moving through airspace is controlled by changing the aim point according to the extent a suitable laser beam, called a windage beam, deviates from a straight line path. Knowing the deviation or deflection of the windage beam, the integrated velocity of the wind which caused the beam deflection can be ascertained based on calibration tables. Then the aim point of the article is adjusted, taking into account a measurement or estimate of the range of the target. In the example of gun firing a bullet, the gun bearing, or angling, is adjusted toward the upwind direction, in an amount sufficient to compensate for the anticipated downstream deflection of the bullet due to the laser-measured wind velocity. Then the gun is fired and the bullet travels along a wind influenced curved path to the target.

The bullet flight path adjustment is more refined than has been possible in the past, particularly because the invention determines the mathematically integrated effect of the wind along the whole flight path. Thus, greater accuracy of shooting can be expected.

In some embodiments relating to shooting of a gun, a laser beam, called a spotting laser beam, is shined at the target to determine the line of sight (LOS) from the shooter location to the target. The deflection of the windage laser beam is the distance between its impact point and the spotting beam impact point. A single laser may operate in a first spotting beam mode and a second windage beam mode.

In accord with another embodiment of the invention, means and method similar to that used with the gun are used for adjusting the flight path direction of an airplane which is approaching a landing strip, where there are horizontal and or vertical winds transverse to the just-ahead flight path. The laser source may be located on the aircraft or adjacent the landing strip (the target).

In accord with another embodiment of the invention, similar means and method are used for adjusting the path of a boat traveling across a body of water under the influence of wind. For both the aircraft and boat uses, the information about the wind effect along the whole of the beam path can be quickly and repetitively gathered.

In accord with still another embodiment of the invention, the motion of wind or a gas can be determined for a purpose other than aiming an object to a target. In embodiments of the invention, a gage or meter suited for industrial or commercial use comprises a laser of the windage (thermal blooming) type which projects a laser beam through the fluid, to determine its velocity or flow rate. The fluid is one in which the chosen laser beam causes thermal blooming. Measurement of the displacement of the beam is used to calculate the velocity of fluid, and from that the volume flow rate may be found using calibration data or calculation. A gage of the invention is suited for quick measurements without necessitating contact of a sensor with the fluid. And it is particularly suited to measuring low flow rates, because that is when beam deflection is greatest. Similarly, the velocity of unconstrained fluid masses may be found. As an example, a sailboat can obtain information about the velocity of wind remote from its location, and thus alter its course to seek the best wind condition.

The foregoing and other objects, features and advantages of the present invention will become more apparent from the following description of preferred embodiments and accompanying drawings.

BRIEF DESCRIPTION OF THE DRAWINGS

FIG. 9 shows how the distortion parameter of a beam is function of the deflection of the beam varies with wind-induced deflection DF, normalized for undistorted beam diameter a.

DESCRIPTION

Figure 1:
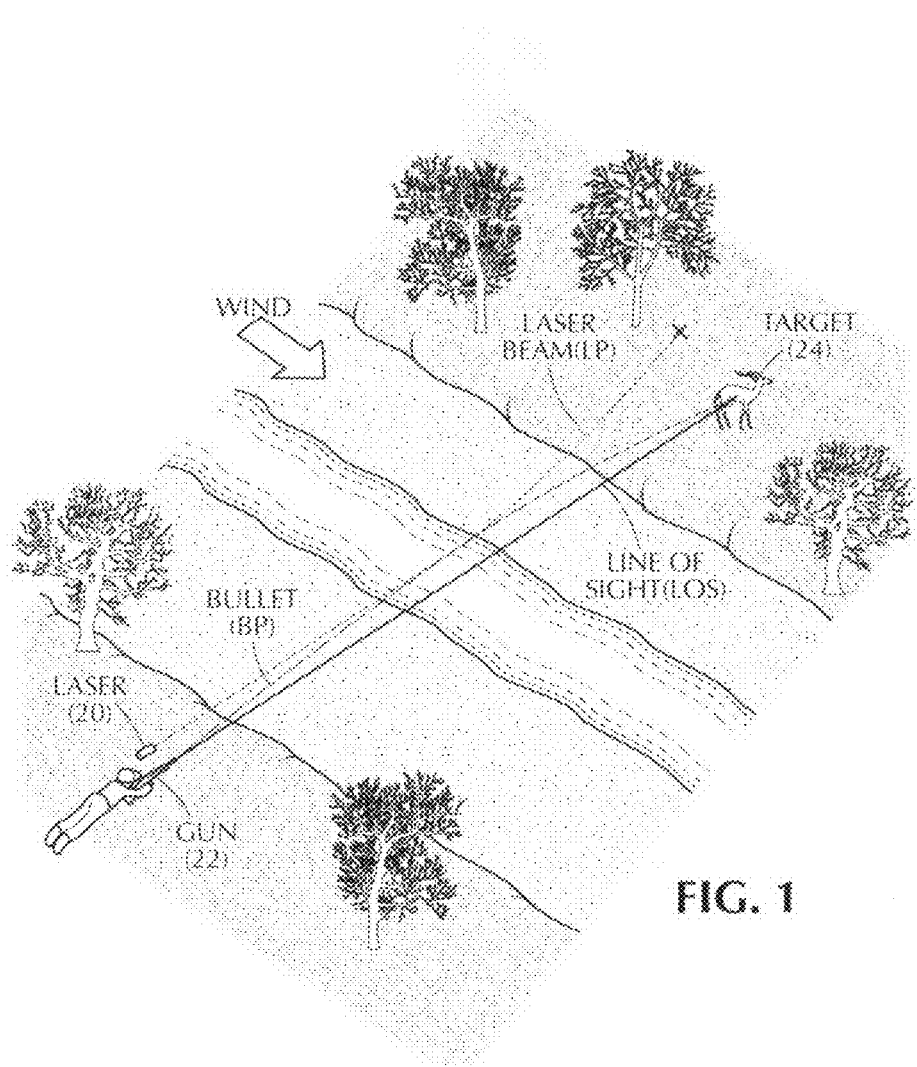
FIG. 1 pictorially illustrates how a shooter angles a gun barrel upwind so a bullet hits a distant target when there is wind transverse to the bullet path; here, in the case of a hunter shooting across a gorge at an animal.

The invention makes use of an atmospheric phenomenon generally called thermal blooming. When beams of sufficiently high energy and certain wavelengths are transmitted through a fluid medium, in particular a gas such as air, the medium is heated by absorption of a fraction of the beam radiation. Thermal blooming is something that is generally unwanted by those who use high power lasers, since the purpose of such lasing most often is to transmit energy to a remote point.

In the invention, a laser beam of selected wavelength and intensity heats a moving medium, resulting in the beam being distorted and deflected from a straight line path. When, for example, atmospheric air is moving transverse to the beam path, the thermal blooming effect is asymmetrical in that the air temperature is higher on the downstream side of the beam (also called, the downwind, or leeward side of the beam). As a result the index of refraction of the air is lower on the leeward side of the beam, compared to the index at the windward side of the beam. That difference in refracting index causes the beam to deflect, or bend, in the upstream direction (also called the upwind, or windward direction).

The extent of thermal blooming is directly proportional to the intensity of the beam and inversely proportional to the transverse velocity of the wind. The total deviation or deflection of a given beam, measured at a distant point, is therefore reflective of the integration of the deviations of the beam that take place along the increments of the length of the beam path. The total deviation of the beam is a measure of the integrated effect of transverse wind along the increments of the beam path.

Embodiments of the invention which involve shooting a bullet from a gun, such as a rifle, are described first. The invention enables a shooter to hit a target, whether small or large, stationary or moving, under conditions where wind would ordinarily cause the projectile to miss the aim point at the target. Manufacturers of bullets provide data showing how much a certain steady wind will cause a bullet to deviate from its intended flight path for given ranges. Alternately, experimental data can be gathered, and or calculations can be made. In the invention, when the integrated wind velocity, i.e. often approximately the average velocity, is known from its effect in bending a laser beam upwind, then the needed amount of compensation in aim point of the bullet can be determined based on the manufacturer or experimental data.

In this description, a gun barrel has a load end (breech), at which a cartridge is placed and ignited to propel a bullet, and an exit end (muzzle) from which the bullet exits the gun. The location of the gun on the plane of the earth is referred to as the "source" or as the "shooter location." The "target" is the object which the bullet, or analogous propelled article, is intended to hit. The "aim point" is a distant point with which the barrel of the gun is aligned. "Line of sight" (also called LOS) is the straight line path between shooter location and the aim point. LOS is the path along which a bullet would travel in the absence of air and wind (ignoring the vertically-down effect of gravity, other forces, usually subtle, such as spin-induced deviations and Coriolis effect). LOS may also be considered as the nominal path along which an image from the aim point travels to a human eye or other sensor, when the eye or sensor is positioned in closely proximate the breech of the gun barrel and there is no atmospheric distortion of light waves. The "range" is the distance between the gun barrel and the target. "Bearing" is the angle of the gun in the horizontal plane relative to a reference line, e.g., relative to the LOS. The "travel path" or "flight path" of an article is the path along which the article travels from a first point to a second point. For a bullet, it is path between the gun muzzle and the bullet impact point. Flight path of a bullet is always different from LOS, given the inevitable effect of gravity, and in the examples here, given the effect of wind.

To somewhat simplify the following portion of this description, it is assumed that the gun is shooting horizontally in the local tangent plane of the nominal earth globe surface, and that the elevation of the target is the same as the elevation of the gun. It is also assumed that the wind is blowing perpendicular to the LOS in such horizontal plane. The effect of gravity is illustrated for context, but after that it is ignored, the description assumes the effect of gravity will be separately compensated for in the same way it has traditionally been.

In further simplification, the axes of the beam path of the laser(s) and gun barrel are considered coincident. In reality, as is the case for typical optical gun sights, if the laser(s) is mounted on the exterior of the gun barrel it is slightly offset from the centerline of the barrel bore. A typical offset may be a matter of a few centimeters; and, in many instances that will be inconsequential to distant targets. Nonetheless, suitable calculative corrections may be made in carrying out the invention when the offset is consequential to hitting the target. Similarly, the gun barrel and an associated laser(s) are assumed to be positioned in the same vertical plane which is transverse to LOS, so they are at the same distance from the target. To the extent in a real situation the simplifications are not present, appropriate adjustment or correction will be made in the measurements and calculations which are described, according to what precision is desired.

FIG. 1 is a bird's eye sketch which pictures a shooter aiming a rifle barrel 22 at an animal target 24 which is across a river gorge, down which a wind is blowing. Experience tells that, to hit the target, the barrel has to be angled upwind, i.e., the bearing has to be changed relative to the line of sight LOS. Then, the bullet will move along curved travel path BP which is upwind of the LOS. But the abiding question a shooter has to answer is: How much is the adjustment in bearing? With reference to FIG. 1, use of windage laser 20 produces a laser beam which follows a path LP that curves into the wind. The deviation of the windage laser beam provides a way to answer the question of how much.

Figure 2:
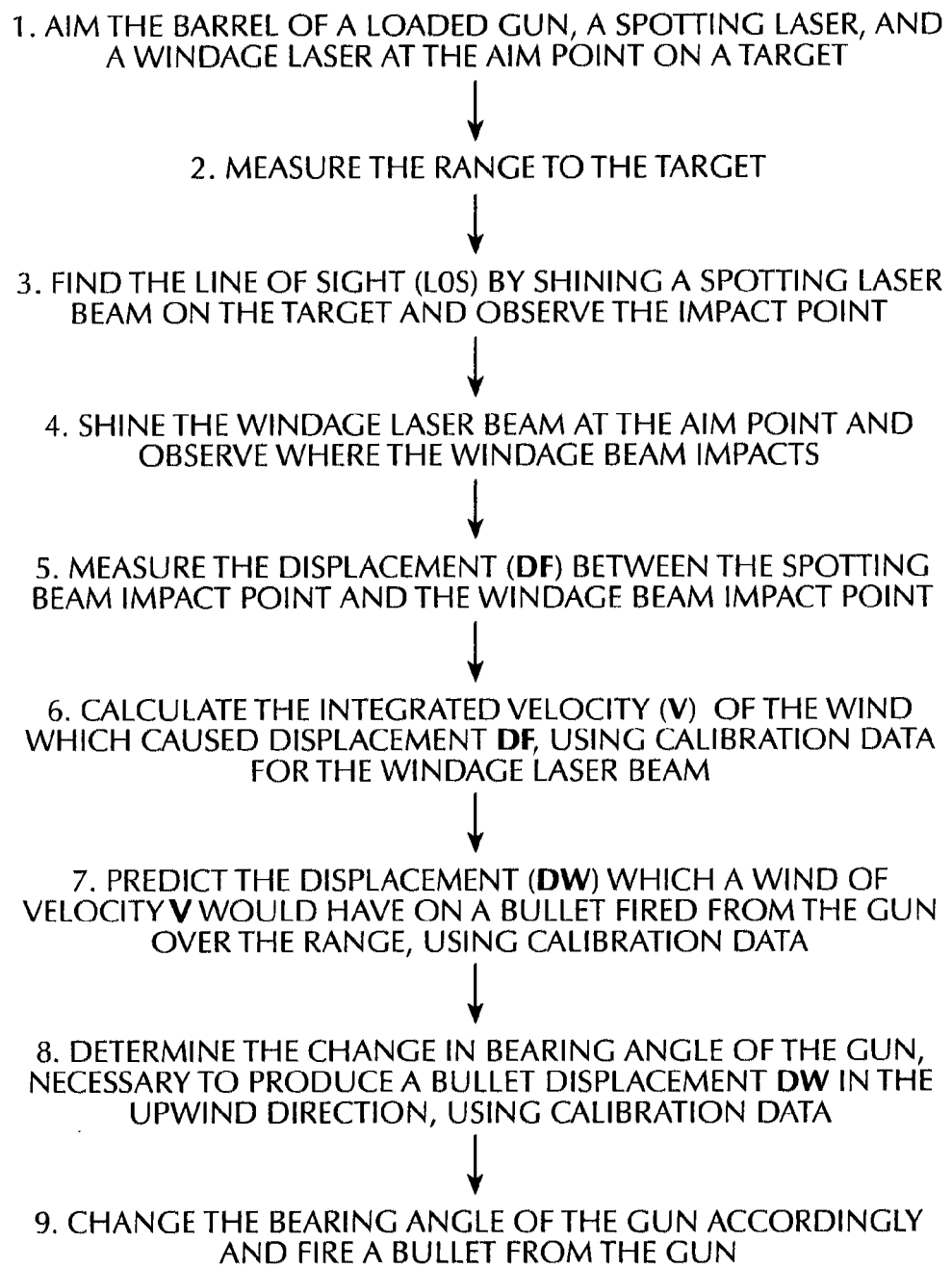
FIG. 2 is a flow chart showing steps in carrying out an embodiment of the invention.

FIG. 2 is a chart showing in succinct fashion the steps involved in carrying out an embodiment of the invention. A brief amplification of the chart follows, just below. Then more detailed and particular aspects of the invention are described. With reference to FIG. 2:

First, the shooter sets up his equipment at the shooting site. The equipment includes a loaded gun, an optional spotting laser or other means for finding the LOS to the target, and a windage laser.

Second, the range to the target is measured, if not previously known. Range is the distance between the source or shooter and the target. That range may be measured by various conventional means, some of which are mentioned below. Alternately, range may be estimated.

Third, the line of sight LOS running from the shooter location to the target is determined. As detailed further below, a preferred method is to use a spotting beam, i.e., a beam which does not cause consequential thermal blooming.

Fourth, a beam from a laser which causes thermal blooming in air is projected from the shooter location toward the target. This second beam is referred to as the windage beam. The windage beam is projected as if to send it along the same path as was traveled by the spotting beam, when a spotting beam is used. Because of thermal blooming, the windage beam deviates from the first beam path, or the LOS. As described below, this aspect of the invention can be carried out by projecting the windage beam along a path which is in the general vicinity of the intended bullet path.

Fifth, the impact point of the second laser beam is observed in vicinity of the target. Then the distance, designated DF here, between the windage beam impact point and the first beam impact point (i.e., the aim point on the target) is determined. The displacement DF is in a plane which is perpendicular to the LOS, because in this example it is posited that the wind direction is parallel to such plane. The second beam is displaced a distance DF because of thermal blooming. If there was no wind or other motion of the air, DF would be zero because the effect of thermal blooming is symmetric. Generally, in this step the deviation of the windage beam from a straight line path is determined.

Sixth, the integrated velocity V of wind which caused displacement DF is calculated, using calibration data for the windage laser beam. The calibration data take into account any necessary adjustment for air density and humidity or air parameter other than wind which affects the beam displacement. In the absence of need for such adjustments, the displacement DF is inversely proportional to the integrated effect of the wind velocity along the beam path, and directly proportional to range.

Seventh, a determination is made of the displacement DW from LOS which a bullet would have at the end of a path equal to the range, if the bullet were to be shot through air having transverse velocity V. The predicted displacement is based on calibration data for the particular cartridge, such as is commonly provided by a manufacturer; or the data may be experimentally determined.

Eighth, the necessary change in bearing of the barrel of the gun (or horizontal plane angle of the gun relative to the LOS) is determined, again from calibration data. That change will be sufficient to cause the bullet to hit a point a distance DW from the aim point on the target, in air which is not moving.

Ninth, the bearing of the gun barrel is changed and the bullet is fired from the gun. The gun will be angled in the upwind direction. Assuming other effects such as gravity have been compensated for, and that there are no atmosphere changes in the expected short interval between time of windage beam impact and time of firing, the bullet should then hit or come very close to the target.

Figure 3:
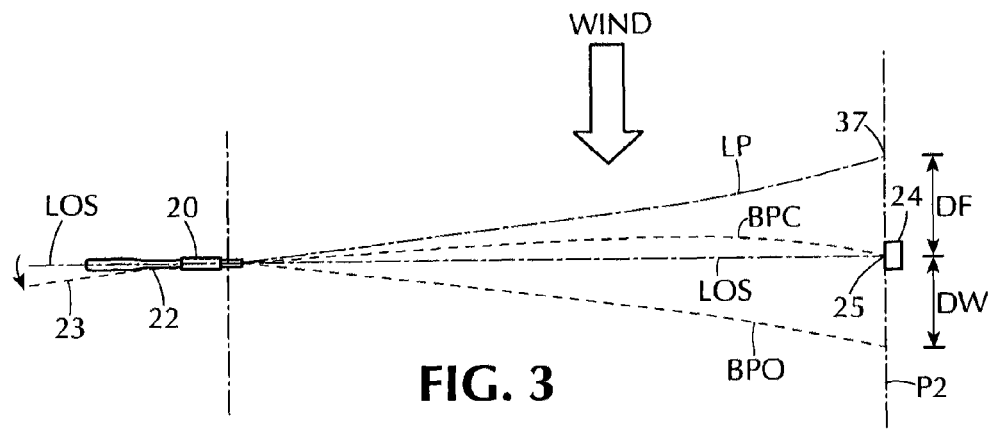
FIG. 3 is a schematic plan view of a system comprising a windage laser and a gun configured for sending a bullet on a wind-corrected flight path in order to hit a target.
Figure 4:
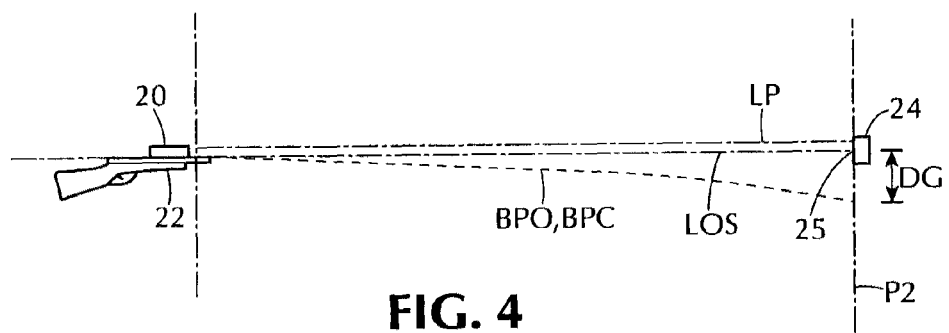
FIG. 4 is a schematic elevation view of the components shown in FIG. 3.

In further elaboration of the above, the schematic drawings of FIG. 3 and FIG. 4 respectively represent plan and elevation views of a gun barrel 22 positioned to shoot a bullet across windy air space to the aim point 25 on a target 24. For purposes of illustration, the deflections of the laser beam and bullet in all Figures herein are greatly exaggerated.

The range to a target is first determined. This may be known by prior direct measurement; or by estimation; or by one or more of a variety of known ways, including by means of stadia incorporated into a gun telescope reticle, coincident image ranging, stadiametric ranging, radar ranging or laser ranging.

Lasers which create a spotting beam and a windage beam are mounted on, or very close to, the gun barrel. For simplicity of this part of the description, it is assumed that there is only one laser 20 which provides both the spotting beam and windage beam. (As indicated below, this is also practical.) The critical elements of the laser 20 and gun 22 are in line with vertical plane P1 at the shooter location, or any deviation is trivial. The target and impact point of the laser beam are substantially in vertical plane P2. To the extent, in carrying out the invention in other embodiments, the foregoing elements are not within the same planes, appropriate adjustments in calculations can be made.

FIG. 4 shows how the bullet will drop due to gravity and will impact target a distance DG below the aim point. (The azimuth correction for gravity deflection, i.e., angling the barrel upwardly, will be assumed and ignored hereafter in this description.)

Referring to FIG. 3, the gun barrel 22 and co-aligned laser 20 are pointed at the aim point 25 on the target 24, along line of sight LOS. The LOS may be established by means of conventional optical sights; or by geometry based on mapping, or by layout of the gun and the target; or by other means. Preferably LOS is found by shining a collimated or uncollimated light beam on the target. Such a beam is called a spotting beam or a first beam. A laser used for finding LOS is called a spotting laser; and it has wavelength and power insufficient to cause thermal blooming in the local atmosphere. Spotting beams may be created by lasers of the kind familiarly used as pointers in connection with personal firearms, for instance, by a red laser diode or a green diode pumped solid state (DPSS) laser. (This description continues in terms of use of a spotting laser beam; but it should be understood that other means of finding LOS are within contemplation and are substitutional.)

Assuming there is a wind, as shown by the large arrow in FIG. 3, a bullet shot with the gun aimed along the LOS will be moved by the wind so it travels along path BPO. It will miss the aim point and hit downwind of the target. To avoid that, before shooting, a windage beam is discharged from the laser 20. The beam will deflect upwind due to thermal blooming, and will travel along path LP, impacting at point 37 in plane P2. The impact point 37 of the windage beam may be observed visually by the shooter, using as necessary a suitable means for converting the re-radiation of the impact beam to human-visible radiation. Alternately, the impact point 37 may be determined by optical sensors or other suitable electro-optical devices located at the shooter position. This is discussed further below.

The wind-induced deflection DF of the windage beam is the distance between points 25 and 37. It can be measured by various means, such as by means of a telescope having a graduated reticle; or by measuring the included angle between a telescope sighting on the first point and then the second point and then using trigonometry, given the range is known. Other known means for remotely determining lateral spacing of things from a distance may be used.

Given the previously determined range to the target and the deflection DF of the windage beam, the amount of wind and needed adjustment in bearing of the gun barrel are now determined. This may be done by a two-step process. The first step is to determine the wind property that caused the windage beam to deviate. The second step is to determine how much the angle of the aim of the gun, i.e., the bearing, should be changed to compensate for the wind property.

Figure 5:
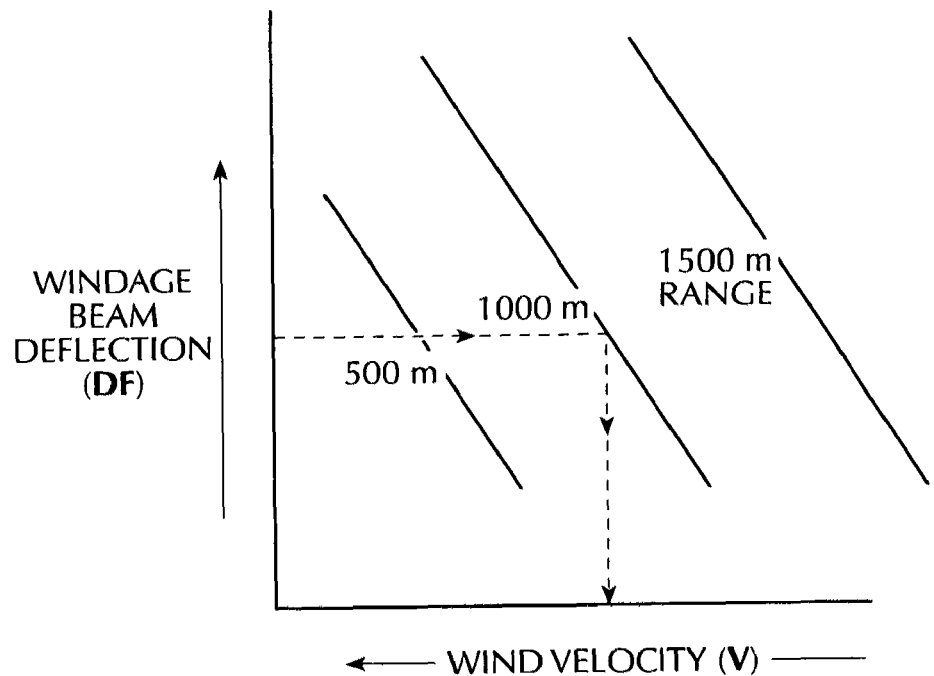
FIG. 5 is a graph schematically showing the relationship between windage beam deflection and wind velocity for different ranges.

The behavior of the windage laser beam under different transverse wind velocities is assembled from experiment data and or calculation, for the particular windage laser. That behavior is referred to here generally as calibration data. It may be manifested in the form of a lookup table or algorithm, or a graph. FIG. 5 is a schematic illustration of graphical calibration data, to give an example. The dashed line with arrows shows how the graph is entered, to provide the wind velocity for a given windage beam deflection and range, e.g., 500, 1000, 1500 m. The calibration data will take into account other parameters, as may be needed for precision, for example, the density and humidity of the air, which affect the degree of thermal blooming. Preferably, a windage laser will be calibrated for such kind of atmospheric conditions in the field a short time prior to beaming of the laser, that is, prior to carrying out the fourth step described above and in FIG. 2. A portable calibration cell may be constructed and used, wherein the windage laser beam or a surrogate is transmitted along known short-length path to a sensor which determines the beam deviation and provides the basis for the calibration data referred to in connection with FIG. 5.

Figure 6:
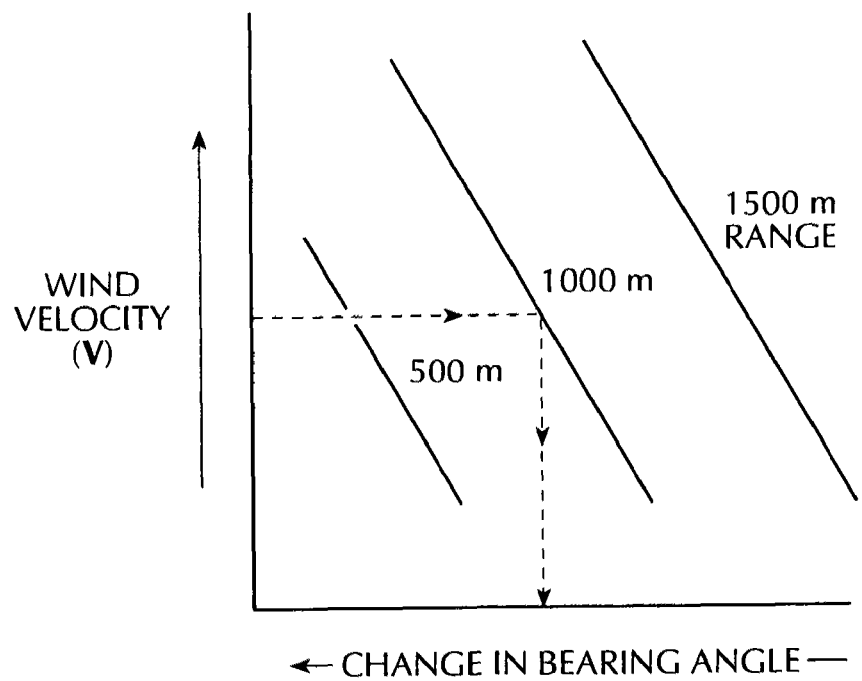
FIG. 6 is a graph schematically showing the relationship between wind velocity and the correction in direction of the gun barrel which needed, for different ranges.

The behavior of the gun bullet under different transverse wind velocities is likewise assembled beforehand from experimental data and or calculation. The calibration data will reflect the combined effects of range (i.e. travel time of the bullet) and wind on the deviation of the bullet from a straight line path. Often bullet manufacturers provide such data. Given the calibration data, and knowing the average wind velocity, a shooter can determine by what dimension the apparent aim point of the gun barrel has to be offset upstream, i.e., how much the gun barrel has to be angled upwind, so that the bullet will travel a curved path through space and arrive on the target. See FIG. 6 which is a schematic illustration of graphical calibration data, analogous to FIG. 5.

Rather than going through the just-described two step process tables or algorithms may be constructed which directly indicate how much the bearing should be changed where there is a certain deflection of the laser beam. Of course, the steps in which the behavior of the windage laser is converted to adjustment of the aim of the gun can be carried out in automated manner by suitable sensors, computer processors, and actuators. Even further, many of the steps illustrated in FIG. 2 may be automated by use of suitable electronic and optical devices, along with electromechanical apparatus which holds the gun and automatically adjusts the aim and fires the gun.

Table 1 shows the approximate deflection of a typical .30-06 bullet based on manufacturer handbook data, in combination with the calculated windage beam deflection for a 10.6 micron carbon dioxide laser operating at nominally 10 watts and having an about 1 cm beam spot diameter.

TABLE 1

Effect of wind on windage laser beam impact point and bullet impact point at 1000 m range.

| Wind - mph | Wind - cm/sec | Windage laser deflection - cm | Bullet deflection & aim point correction - cm |
|---|---|---|---|
| 70 | 3100 | 0.1 | 1109 |
| 7 | 310 | 1.0 | 111 |
| 0.7 | 31 | 10.0 | 11 |

While the above description has been in terms of wind which only blows in the horizontal plane, the effect of wind in other planes which include the LOS and are tilted upwardly to the horizontal plane can readily be determined and compensated for.

For good accuracy, when the windage laser is displaced from proximity of the gun barrel, the beam may be guided to the proximity of the gun barrel by mirrors, fiber optics, or other means having similar function. A refracting prism might be placed in front of the barrel, to direct the beam along the path intended by the bullet, when the prism is constructed with a passage to allow pass-through of the bullet. In all such situations, the source of the laser source will be considered the point at which the beam is discharged into the air, to travel to the target, in proximity to the gun muzzle.

In another embodiment, the thing which the beam shines upon in vicinity of the target may include a stationary or moving object; and, it may even include a dust or vapor cloud, i.e., anything which reflects the beam or signifies the impact of the beam. The embodiments above have been described in terms of a windage beam that hits the target or a physical object in the vicinity of the target so that the reflection of such beam will be sensed by the shooter. If the situation permits, light sensors installed in vicinity of the target can provide the desired information about windage beam deflections.

In another embodiment, the laser may be offset laterally or vertically from the gun. This may done when suitable mathematical correction can be made, the amount of possible error is not significant to the hitting the target, etc. For example, the windage laser beam may be sent along a path which parallel to the LOS, but offset laterally or vertically.

While, in the embodiments described thus far, the windage laser beam has preferably been projected along the entire path which approximates the LOS to the target, in the generality of the invention, the windage beam could be directed to an object at a way point, to permit windage correction for at least a portion of the flight path. Alternately, the point of impact of the windage laser beam may be on an object which is farther from the shooter or source than is the target. In another example, the windage laser beam may be projected at an angle to the LOS. Corrections for such variations can be made; or a bullet can be fired knowing that the most accurate adjustment has not been made.

Figure 14:
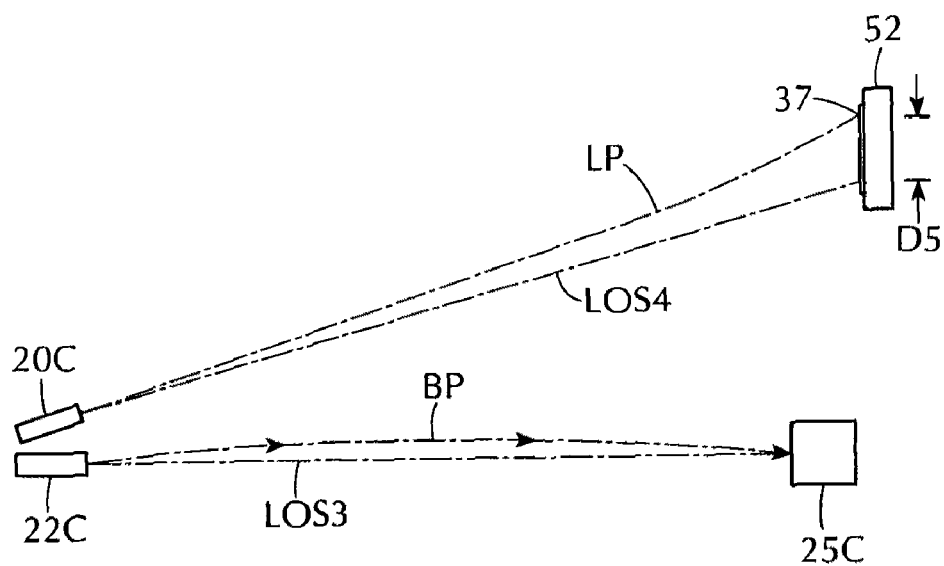
FIG. 14 is similar to FIG. 3, showing a schematic top view of a gun and laser system, where the impact point of the laser is on an object which is offset from, and in a different plane from, the target.

FIG. 14 illustrates a system having some of the foregoing characteristics, which might be used when there is a desire to avoid alerting the target that it is being targeted. Laser 20C is aimed at an object 52 which is laterally offset from, and in a more distant plane than, target 25C. The wind induced deflection DF of the beam is measured relative to LOS4. The difference between the range to object 52 and the range to target 25C can be compensated for, in determining how much gun 22C is angled upwind relative to LOS3. Thus, when gun 22C is fired, the bullet will travel along curved path BP and hit the target.

While the invention has been described in terms of measuring DF, the amount of deflection which a beam is subjected to and the needed correction can be inferred without directly measuring DF on surfaces upon which the beam shines. For example, the curving of the windage beam might be ascertained relative to a straight line by a sensing system which looks vertically down on the curving path of a windage laser and compares it to the straight line path of a spotting laser, where both laser beams emanate from the same source location. The system would be able to ascertain how much one beam was displaced from the other at any point along the beam travel paths. Thus, it is within the scope of the invention to use such other non-physical means as may be available now or in the future to detect the location of a windage beam and its displacement from a straight line, including the LOS, irrespective of whether it actually impacts on an object.

In another embodiment of the invention, the laser beam source may be in vicinity of the target, and the beam displacement will be measured at the location of the shooter. It is also within contemplation that one or more reflectors could be placed in vicinity of the target, so that deflection of the windage beam could be measured at the shooter location, based on the total travel of the beam to and from vicinity of the target, the total displacement caused by the double trip.

In partial summary, a windage beam may travel through only a portion of the airspace or it may travel beyond the target; it may travel directly to the target, or it may travel to a point which is offset from the target. To the extent the beam does not travel approximately along the intended path of the bullet to the gun, certain errors may result and adjustments may be required, but the method and system will nonetheless be useful. The beam may be projected toward or away from the target. Thus, in the generality of the invention, the laser beam is projected into airspace between the source and the target, sufficient to produce information about its deviation from a straight line path, to enable prediction of the wind effect and resultant correction in aim, so that better accuracy is obtained.

An exemplary windage laser has a beam, the energy of which is both sufficient to reach the vicinity of the target and of wavelength and intensity of which are sufficient to cause thermal blooming and a resultant beam deviation that can be measured. Typically, the displacement of the beam will be at least a few beam diameters. The following examples of laser systems are exemplary and should not be construed as limiting.

An exemplary windage laser has a beam wavelength which is absorbable by a gas which comprises air, for example by oxygen, and the atmospheric absorption is at least $1.0 \times 10^{-5}$ cm$^{-1}$. For a situation where the range is about 1000 m, an exemplary laser is a collimated 694 nanometer ruby laser which is temperature tuned for atmospheric absorption in the range of about 1×10$^{-5}$ cm$^{-1}$ to about 3×10$^{-5}$ cm$^{-1}$.

Another exemplary windage laser is a familiar 10.6 micron $CO_2$ laser. In air, the typical atmospheric absorption is 0.2× 10$^{-5}$ cm$^{-1}$ when the air has about 440 parts per million $CO_2$ and is at 30% relative humidity and 70° F. Generally, for best performance, a windage laser will be tuned to a wavelength where the absorption is maximized. For example, a $CO_2$ laser will be tuned so its output wavelength is concentrated in a band centered on about 9 microns or about 12 microns, as those are wavelengths where there is greater atmospheric absorption than at 10.6 microns.

Further exemplary lasers include fiber optic lasers and diode lasers. Within those classes of devices there are multiple choices of wavelength and size. As an example, a laser producing a beam with a wavelength in the range of about 2.2 to 3 microns, preferably 2.9 microns, may be used. An about 2.9 micron wavelength laser is not perceived by the typical human or other mammalian animal eye, and using such laser would be an advantage if animals are intended targets. The 2.9 micron wavelength is generally considered eye-safe to humans. If a laser of such wavelength is used, the shooter may make use of a near infrared detector or a camera to observe the laser spot at the target location.

The first and second beams, i.e., the spotting beam and windage beam, may emanate from first and second lasers. Alternately, the beams may issue from the same laser. For example, the first beam from the single laser will be at a low power and the second beam will be of a high power. Alternatively, the first beam and second beams may be at different wavelengths, when the nature of the laser admits. An exemplary laser using this mode would be a 10.6 micron $CO_2$ laser, operated at about 0.1 watt in the spotting beam mode and about 10 watts in the windage beam mode.

It is contemplated that, given continuous development by laser manufacturers, in the future there will be lasers better suited for use in the invention, including lasers that have more favorable combination of cost, efficiency, and portability than do the choices commercially available at the present time.

Windage lasers used in the invention may send out steady or continuous beams, for such duration as may be needed to acquire the windage data. The temperature gradient transverse and lengthwise to the beam path will desirably reach steady state. Thus, the minimum duration of windage laser irradiation is best made equal to, or preferably slightly greater than, the time for steady state conditions to be reached. Such minimum time can be calculated and or experimentally determined.

In general, it is desirable to reduce laser power consumption of a windage laser, particularly when using battery power supplies. One option is to pulse the laser, and calculations indicate a pulse laser may be advantageously used. The average power may be reduced by using a proper selected combination of laser pulse and repetition rate. For example, if a 10 watt laser is operated for periods of about 100 milliseconds spaced apart by no-power intervals of 900 milliseconds, the average power consumption is about 1 watt.

The minimum pulse length, $t_p$, may be calculated from: $t_p = 3a/V$, where a=beam radius and V=wind speed. So, as an example, if the laser has a collimated 1.2 cm beam and the wind velocity is 1 mile per hour (44.7 cm/s), the required pulse length would be 0.08 s. Thus if each pulse has an energy of 0.8 joule and the repetition rate is one pulse every 1.2 s, then the average laser power would be about 1 watt. This consumption would compare favorably with a 10 watt continuous beam laser operated for one second. Obviously, for higher wind speeds and faster repetition rates, power would be greater than 1 watt.

In another refinement of the invention, a windage laser may be tuned to provide a particularly desirable wavelength, which wavelength is more particularly absorbed by air, to thus enhance the thermal blooming and the extent to which the windage beam is displaced. For example, a $CO_2$ laser may be tuned by placing a wavelength-selective element (such as an etalon) into the optical cavity of the laser, so that the beam wavelength as at about 10.81 microns, reflective of the P40 transition, compared to the most commonly used wavelength of 10.59 microns, associated with the P20 transition. Because the absorption of the longer wavelength radiation by ozone present in air will be several times greater than absorption of the shorter wavelength, a smaller power laser can be used to achieve useful thermal blooming and beam deviation.

The following description is in support of the foregoing, and shows how certain laser phenomena corroborate the effectiveness of the invention.

The intensity of the beam and its distribution on a planar impact surface will vary according to the nature of the laser and the character of the air through which it travels. The distribution in energy of a beam (or, put another way, the distribution of the intensity of beam energy in a plane transverse to the beam direction) at the point of impact can be measured experimentally by shining the beam on thermally sensitive paper.

Figures 7, 8:
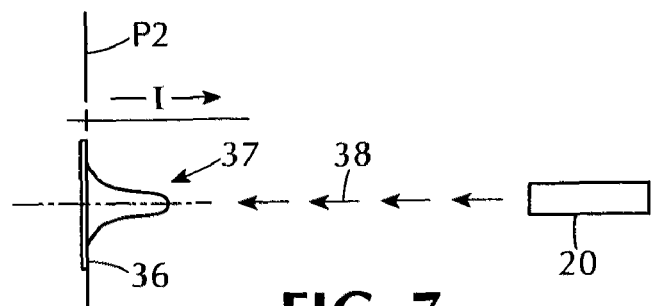
FIG. 7 is a representation of how the intensity of a typical windage laser beam varies in one dimension when impacting the surface of an object.
FIG. 8 shows the distorted patterns of the intensity of a beam varies in the plane of the surface upon which the beam impacts, for different distortion parameters, laser powers and wind velocities.

FIG. 7 is a graph showing the variation in one dimension of intensity I of a beam 38 from windage laser 20 which is impacted on a planar surface 36 located at plane P2. A thermally sensitive paper placed at surface 36 enables the measurement of beam intensity according to its thermal effect.

FIG. 8(a) through FIG. 8(f) illustrates experimental data gathered in accord with FIG. 7, where a 10.6 micron CO2 laser beam passes through air moving transversely to target 36. Each of the FIGS. 8(a) through 8(f) has a different distorted pattern, and each has a calculable centroid. The lateral shift (not shown in FIG. 8) of the centroid is a measure of the displacement of the beam from the LOS. The patterns show the effect of moving air on the beam. Because FIG. 8 is a line drawing, it does not also illustrate how the brightness of the image will vary within a pattern. Each of the patterns in FIGS. 8(a) through 8(f) has an associated set of parameters, namely P (laser power in watts), V (wind velocity in cm/sec), and N (distortion parameter in cm$^{-1}$), as indicated by the table entries in FIG. 8.

Figure 9:
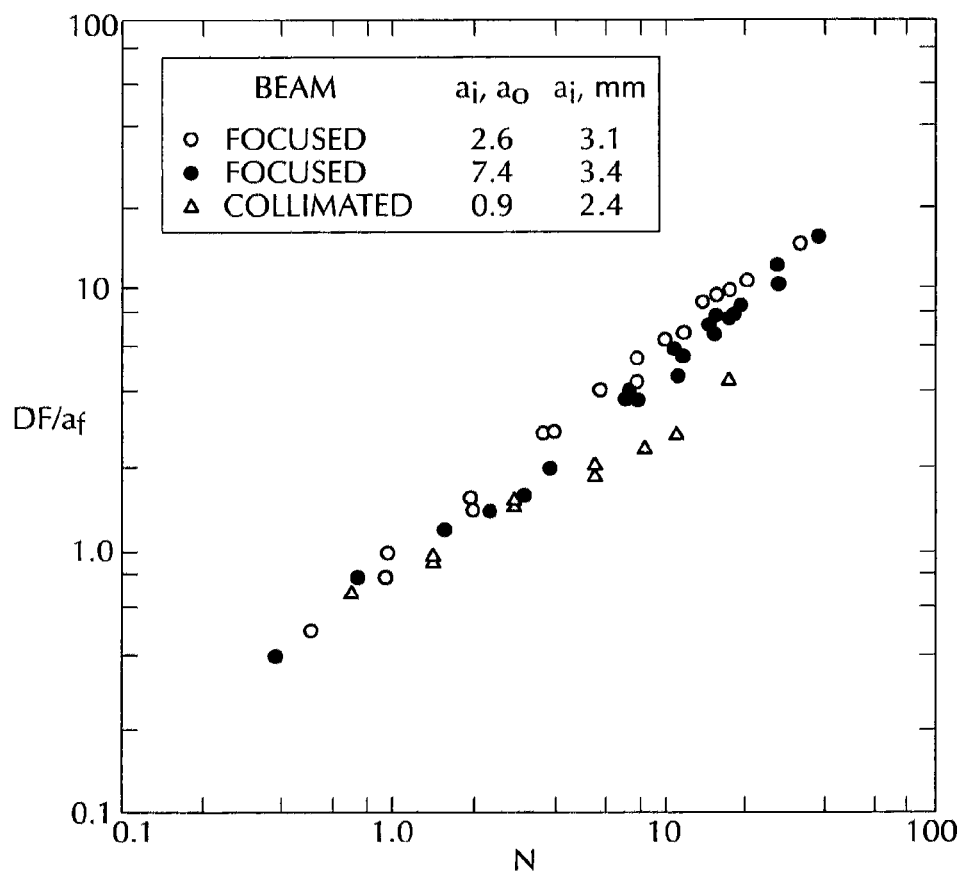

FIG. 9 is a plot showing representative data that correlates normalized deflection, DF/$a_f$ with distortion parameter N, for two uncollimated beams having two different focus ratios ($a_f/a_o$, where $a_o$ is the beam initial radius) and a collimated ratio, as indicated by legend inset in the graph. DF/$a_f$ is beam deflection, normalized for beam radius. FIG. 9 demonstrates that when beam intensity is measured in an experimental set up, thermal blooming is manifested in sufficiently predictable relationship to enable the integrated effect of the wind along the path of the beam to be measured. The nominally nearlinear variation of log DF/$a_f$ vs. log 1/V is at least valid for values of DF which correspond with 10 beam diameters or less. Of course, reproducible non-linear behavior would also be useful in carrying out the invention.

Beam-normalized deflection DF into a wind, which is induced by thermal blooming can be expressed as follows:

$$(DF) = aN = \frac{(-\mu_t)PR(1 - e^{-aR})}{\rho c_P \pi a^2 V} \quad (1)$$

where DF is in cm; "a" is the beam radius in cm; R is range in cm; P is laser power in watts, $\mu_k$ is the refraction index change with temperature at STP; V is wind velocity in cm/sec, $\rho$ is density of air at STP; $c_p$ is specific heat of air at STP; and aR is the absorption parameter of Behr's Law.

For more information, see the technical paper: Smith, D. C. "High Power Laser Propagation," Proceedings of Institute of Electrical and Electronic Engineers (IEEE) Vol. 65, No. 12, p. 1679, December 1977, the disclosure which is hereby incorporated by reference.

When the term aR is much greater than one, the foregoing equation (1) simplifies to $$V = \frac{\mu_t PR}{\rho c_P \pi a^2 (DF)} \quad (2)$$

Using the formula (2) enables calculation of the windage beam data in Table 1.

While the embodiments of the invention have been mostly described in terms of a projectile traveling nominally parallel to the local horizontal plane tangent to earth surface, the invention will readily be applied to a projectile which is aimed in another plane which is at an azimuth angle to said local horizontal plane.

A gun which is a firearm, in particular a rifle, has been used to exemplify the practice of certain embodiments of the invention. Other guns within the scope of invention include artillery pieces and guns which are mounted on land vehicles, watercraft, and aircraft. More generally, the scope of the invention, and the meaning of the term "gun" or "propulsive means" in the claims herein, will encompass the use of any means for imparting motion to a projectile (such as by impulse, change of momentum or velocity, etc.), to make the projectile fly through space to a target. Examples of such means include, but are not limited to: use of chemical energy (as in firearm); use of direct or indirect application mechanical force (as by springs, propellers, compressed air, gas turbine exhaust); and electromagnetism (as in rail guns).

The systems, principles and concepts of the invention may be applied to other situations. Those include guiding aircraft, including a missile, and guiding watercraft. Examples of those kinds of application are discussed next. In the Figures discussed below, numbered elements with suffices correspond with prior elements having no or different suffix. Reference to a windage laser in the following is reference to a laser which discharges a beam of light which causes thermal blooming to an extent sufficient to be useful for measuring displacement of the beam as a function of the velocity of the medium through which the beam is passing, in accord with all the description above.

Figure 10:
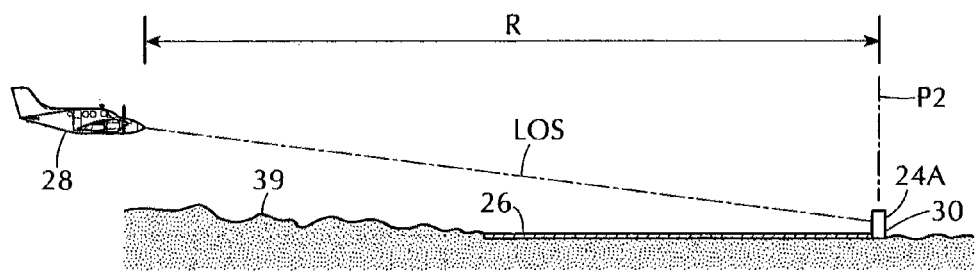
FIG. 10 is a schematic elevation view of an airplane approaching a runway to land, under influence of wind transverse to its flight path.
Figure 11:
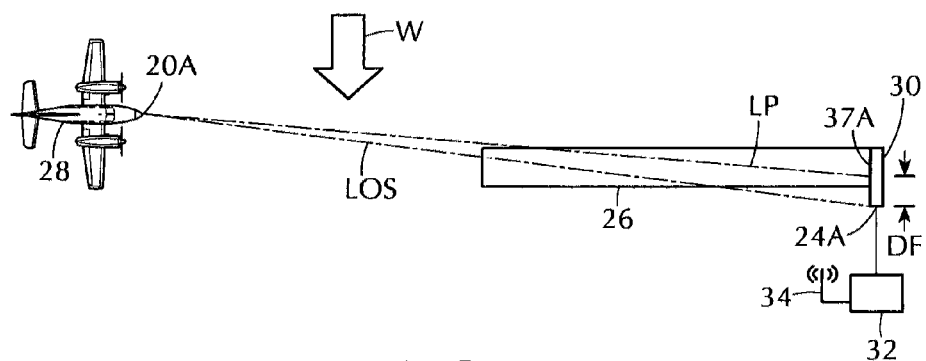
FIG. 11 is a schematic plan view of the airplane and strip of FIG. 10.

Other embodiments of the invention comprise determining the velocities of winds transverse to the flight path of an aircraft which is landing on an airstrip, and adjusting the flight path accordingly. In one embodiment, the windage laser and the spotting laser are mounted on an airplane. FIG. 10 and FIG. 11 respectively are schematic elevation and planar views of an aircraft 28 approaching a runway or airstrip 26 under influence of cross wind W. The windage and spotting lasers are mounted in the aircraft 28 and are aimed at a pre-positioned target 24A adjacent the landing strip 26. The target 24A lies nominally in vertical plane P2 which is transverse to the LOS from the plane to point 25A on target 24A. FIG. 10 shows how the impact point 37A of a windage laser beam, traveling along path LP, is offset distance DF in the windward direction from terminal point 25A of the LOS, i.e., the location of a spotting laser beam impact point. The laser system alternatives and methods described above for a gun system are useful; the foregoing description is hereby incorporated by reference.

The integrated velocity of the wind along the path between the plane and the target can thus be determined based on DF. The pilot, or an alternative automated control system of the aircraft, may have means for remotely sensing DF and, with suitable algorithms, acting upon such information to establish an altered orientation of the aircraft, i.e., of the aircraft propulsive direction. The altered orientation will be that which compensates for the expected effect on the aircraft of a wind as determined by means of the windage laser. Alternatively, there may be sensors at the target location for sending signals relating to DF to a computer processor 32 which wirelessly transmits information to, or commands to, aircraft 28 by means antennae 34.

In variations of the foregoing, the target may be located any where along the runway length; or there may be multiple targets along the length of the runway 26 or the land space 39 in front of the runway. Those targets may be sequentially impacted by the laser(s), to provide further information about the effect of wind along increments of the flight path or runway.

In another variation, the target may be a reflector on the ground, and the beam displacement reflective of the "double length path" from and to the aircraft, may be measured at the airplane. In another variation, the laser may be located on the ground and the target may be the aircraft; and the aircraft may have a beam reflector with the detector located in proximity to the laser source on the ground near the runway. While FIG. 10 and FIG. 11 illustrate a horizontal wind, it should be evident that the system also is capable of detecting wind velocities which are other than horizontal. In particular, the system can be useful in detecting air velocities associated with vertical updrafts and downdrafts, and the establishing the net effect of winds.

Figure 12:
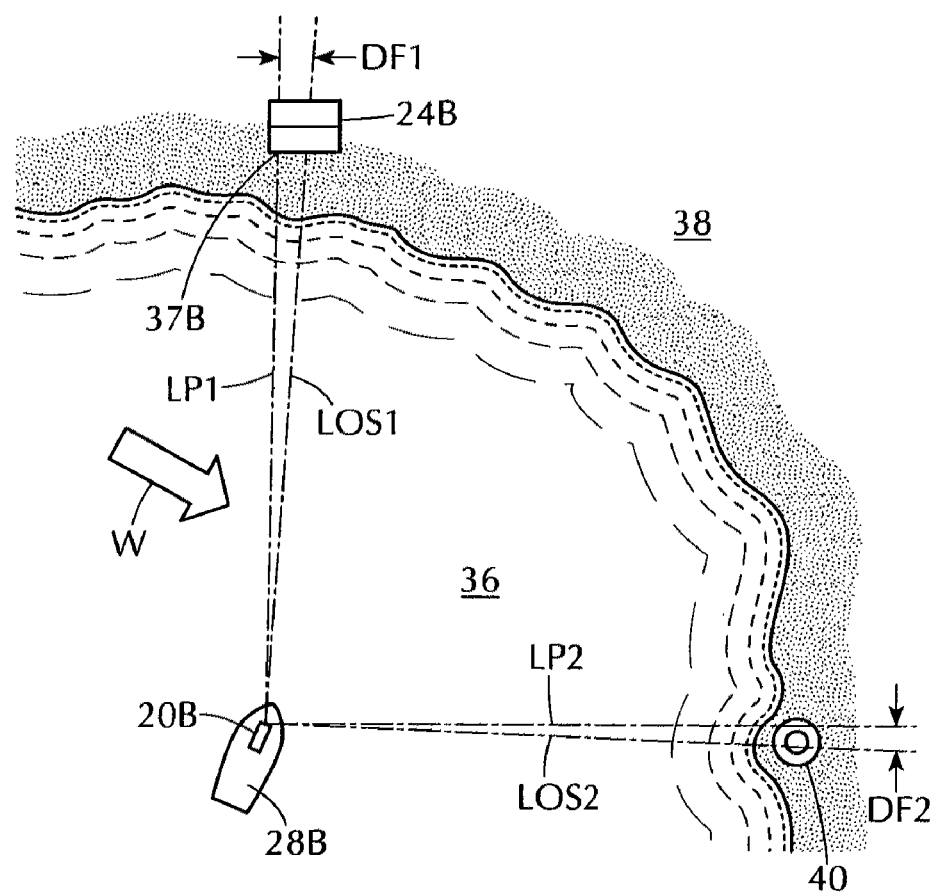
FIG. 12 is a schematic view looking down on a boat moving across the surface of water toward a point on land, under influence of wind.
Figure 13:
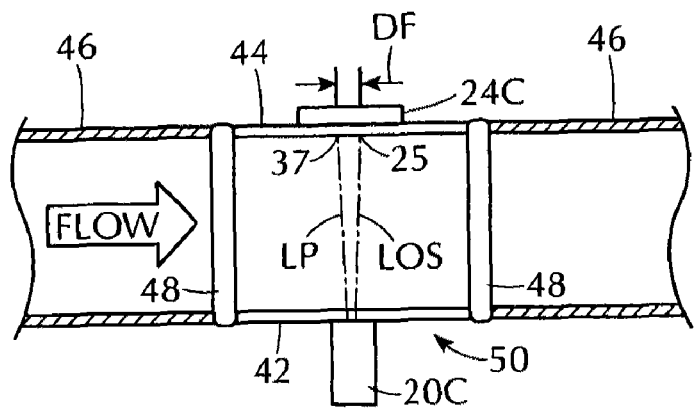
FIG. 13 is a schematic vertical cross section view of a flow gage which uses a laser that causes thermal blooming.

Another use of the invention is in connection with watercraft, e.g., sailing boats or motor boats, traveling across the surface of a body or water where they are influenced by the wind. (Alternatively, the motion of a boat through the water causes motion relative to a static air mass, which relative motion it is desirable to ascertain.) FIG. 12 is a schematic view looking down on a boat 28B which is moving across the surface of water 36 toward a point on land 38, under influence of wind W. The laser system alternatives and methods described above for gun systems and aircraft are useful and the foregoing description is hereby incorporated by reference. With reference to FIG. 12, the effect of a wind having a velocity component transverse to the straight line path LOS1 from the boat to the target is determined by shining the beam of windage laser beam so it travels along wind-distorted path LP1. Change of the sail and or rudder of the boat can be made based the deflection DF1 and the characteristics of the boat. In addition, LOS2 may be established for another target 40 and the deflection DF2 of the laser beam shined along path LP2 may be determined. If done quickly and or repetitively, computation based on the relationship between DF2 and DF1 within context of an earth compass grid may enable more refinement of the wind vectors to which the boat is subjected.

Another use of the invention is in connection with a gage or meter, particularly in context of industry and commerce. FIG.

13 schematically shows in lengthwise cross section gage 50 which is inserted in-line with a fluid carrying conduit or duct 46 by means of connectors 48. A fluid, which may be a gas or liquid, is traveling through the conduit or pipe as indicated by the arrow labeled Flow. Again, the gun-related and aircraft-related descriptions are hereby incorporated by reference. Gage 50 comprises opposing side laser beam transparent windows 42, 44. Target 24C is impinged upon by a beam traveling along path LP from windage type laser 20C. The distance DF between the impact point 37C of the beam and the LOS terminus 25 at the target is measured.

Obviously, when the laser is a fixed part of the gage, the location of the terminus of LOS is always known, and the only measurement needed is the location of point 37C. The less the velocity, the more the beam will be deflected upstream; thus the gage will be especially useful for low flows. Knowing the velocity from the beam deflection DF and calibration tables, and using other previously established calibration tables, the flow volume can be calculated. The gage is particularly suited to measurement of fluids without contact with the fluid. In another embodiment, the target 24C may be a reflector and a detector for measuring deflection DF may be positioned near the location of the laser. In another embodiment, one or more additional windage type laser beams may be passed through the fluid at different orientations within the plane that is transverse to the flow direction, for further refinement or precision, particularly when the duct 46 is not round. For example, two beams may cross at 90 degree angle in the center of the duct. For example, a beam may be transmitted along the chord or an arc of a round duct.

Still another use of the invention is for determining the motion of an air mass, particularly a slow moving air mass, unassociated with landing a propelled object on a target. Thus, a sailor on a boat or a stationary object may beam a laser at a remote target, such as the sail or hull of another boat, or a building or a promontory, etc., and determine in which direction the integrated wind velocity is comparatively higher or lower. According to need, the sailor would then guide the boat to the region or high or low wind velocity. The mode of carrying out this aspect of the invention would be like that described in connection with shooting a bullet, except that there would be no gun. Thus, the sailor would establish the line of sight, including by means of a spotting laser; transmit a laser beam which causes thermal blooming and observe the deviation of the beam. The sailor would establish the range by range-measuring or by charts and global positioning equipment means. In another application, a balloon or glider pilot can determine wind velocities in alternative directions, toward which the aircraft might be headed or might be guided, including measuring both horizontal and vertical wind velocity components.

While the terms air and airspace are used with respect to the foregoing description and in certain claims, those terms should be interpreted to apply to other gas environments than earth atmosphere air. As is well known, atmospheric air commonly contains water vapor. In the generality of the invention, a fluid medium may comprise gases, vapors, liquids and combinations thereof.

The invention, with explicit and implicit variations and advantages, has been described and illustrated with respect to one or more embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail without departing from the spirit and scope of the claimed invention.

What is claimed is:

1. A method for controlling the travel path through airspace of an article to a target, under influence of wind, which comprises:
    projecting a laser beam into the airspace, the laser beam having a character which effects thermal blooming;
    determining the extent to which the laser beam deviates from a straight line path; and,
    adjusting the aim point of the article based on the extent of deflection of the laser beam.

2. The method of claim 1 wherein said article is selected from the group consisting of a projectile fired from a gun, an aircraft, and a water craft.

3. The method of claim 1 wherein the laser beam is projected into the airspace from a source located in vicinity of said article.

4. The method of claim 1 wherein the laser beam is projected into the airspace along a line of sight running from a source located in vicinity of said article to the target, and wherein the extent of deviation of the beam is determined by measuring the distance between the beam path and the target at the target location.

5. The method of claim 1 which further comprises: determining the line of sight from the article to the target; projecting the laser beam along the line of sight toward the target; and, determining said extent of deviation by measuring the distance, transverse to the line of sight at the target location, between the beam impact point and the line of sight.

6. The method of claim 1 wherein the article is an aircraft approaching a landing strip; wherein the target is located in proximity to the landing strip; and, wherein the laser beam is projected from the aircraft.

7. The method of claim 1 wherein the object is a watercraft moving across the surface of a body of water; and wherein the laser beam is projected from the watercraft.

8. Apparatus for propelling a projectile from a source and along a travel path through airspace to a target, comprising:
    means for projecting a windage laser beam into said airspace, generally in the direction of the intended travel path of the projectile, wherein said laser beam causes thermal blooming in the air;
    means for measuring the deflection of said laser beam from a straight line path, at a point along the laser beam path;
    means for measuring the range of the target from the source;
    means for adjusting the aim point of the projectile based on the measured deflection of the laser beam and the range.

9. The apparatus of claim 8 further comprising: means for establishing a line of sight path from vicinity of the source to the target; wherein the apparatus for propelling comprises a gun; wherein the projectile is a bullet; wherein the means for projecting comprises a laser source located in proximity to the gun, oriented to send said beam substantially along said line of sight path to the target; wherein the means for measuring the deflection comprises means for determining the impact point of said beam on the target or in vicinity of the target, and means for measuring the distance between said line of sight and the impact point.

10. A method for causing a projectile discharged from a propulsive means to travel through airspace to a target, within which airspace there is an atmospheric wind having a velocity component transverse to the intended travel path of the projectile, which comprises:

(a) determining the range from the propulsive means to the target;
(b) determining the line of sight LOS between the propulsive means and the target;
(c) projecting a windage laser beam into the space between the propulsive means and target, the beam having a wavelength, intensity and duration which results in thermal blooming;
(d) measuring the deflection of the windage laser beam from a straight line path;
(e) calculating the direction and magnitude of said transverse wind velocity component as a function of said measured deflection;
(f) adjusting the aim of the propulsive means as a function of said calculated wind velocity component, so that when the projectile is discharged form the propulsive means the projectile has a velocity component in the upwind direction relative to the LOS; and,
(g) discharging the projectile from the propulsive means with velocity sufficient to reach the vicinity of the target.

11. The method of claim 10 wherein the windage laser beam is projected along a path to the target which is substantially parallel to the LOS.

12. The method of claim 10 wherein step of projecting the windage laser beam causes the beam to impact on the target or on an object near the target, and wherein said measured deflection is the distance between the LOS near the target and the impact point of the windage laser beam.

13. The method of claim 10 wherein step (b) is carried out by projecting a spotting laser beam from vicinity of the propulsive means to the vicinity of the target, wherein said spotting laser beam does not cause significant thermal blooming.

14. The method of claim 13 which further comprises: using the same laser beam source for the windage beam and the spotting beam.

15. The method of claim 10 in which step (c) first comprises: selecting a source for providing said windage laser beam from the group comprising (i) a continuous wave laser; (ii) a pulsed laser; and (iii) a collimated laser.

16. The method of claim 15 wherein the atmospheric absorption of the beam is at least $1.0 \times 10^{-5}$ cm$^{-1}$.

17. The method of claim 10 wherein the propulsive means is a firearm and the projectile is a bullet.

18. Apparatus for causing a projectile discharged from a propulsive means to travel through airspace to a target, within which airspace there is an atmospheric wind having a velocity component transverse to the intended travel path of the projectile, which comprises:
(a) means for determining the range from the propulsive means to the target;
(b) means for determining the line of sight LOS between the propulsive means and the target;
(c) means for projecting a windage laser beam into the airspace between the propulsive means and target, the beam having a wavelength, intensity and duration which results in thermal blooming;
(d) means for measuring the deflection of the windage laser beam from a straight line path;
(e) means for calculating the direction and magnitude of the transverse wind velocity component as a function of the measured deflection;
(f) means for adjusting the aim of the propulsive means as a function of said calculated wind velocity component, so the aim is in the upwind direction relative to the LOS; and,
(g) means for discharging the projectile from the propulsive means with velocity sufficient to reach the vicinity of the target.

* * * * *